UNITED STATES PATENT OFFICE.

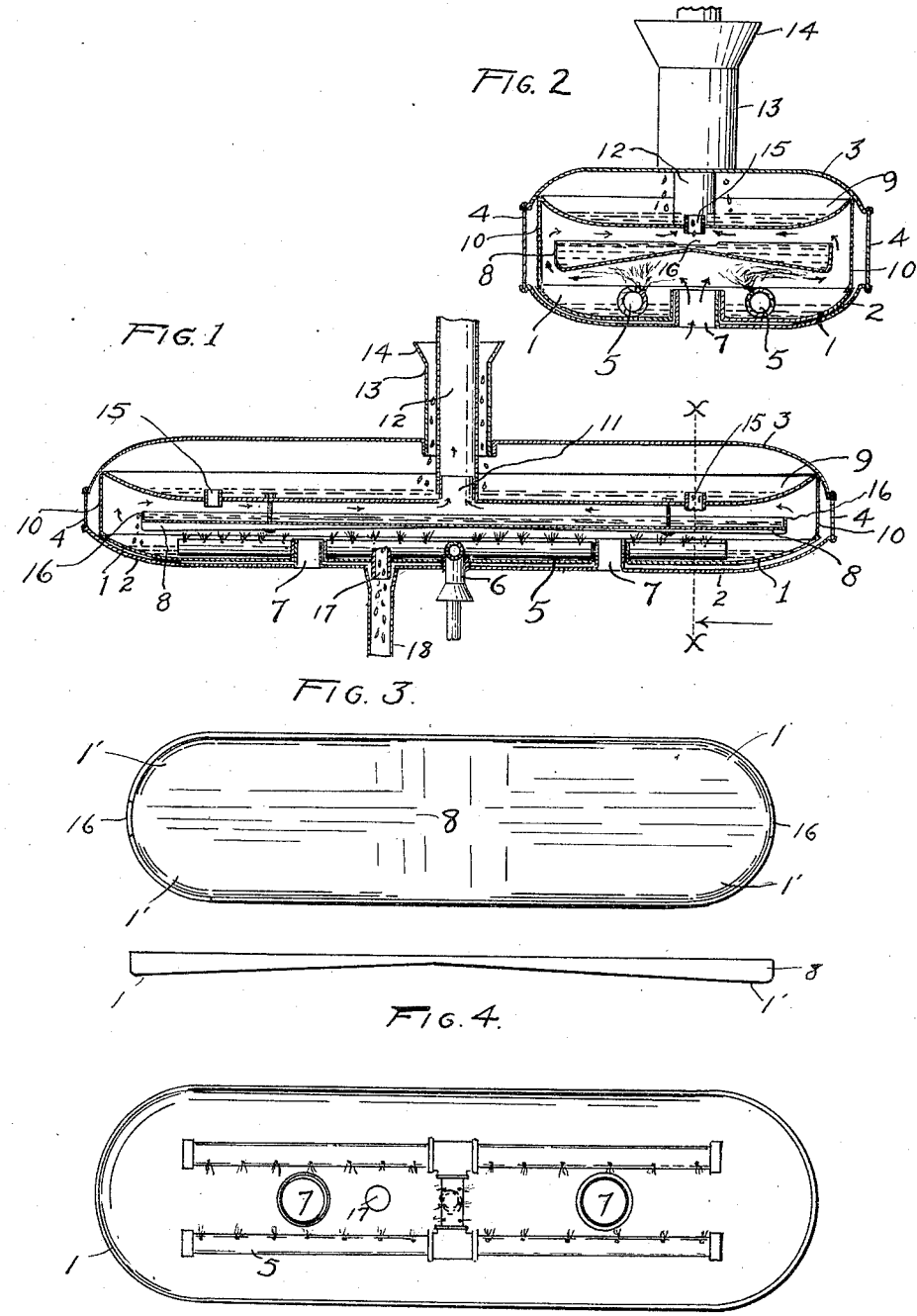

PHILIP G. HUBERT, OF LOS ANGELES, CALIFORNIA; LILY E. G. HUBERT, EXECUTRIX OF SAID PHILIP G. HUBERT, DECEASED, ASSIGNOR TO LILY E. G. HUBERT, INDIVIDUALLY.

WATER-HEATER.

1,049,325.     Specification of Letters Patent.     Patented Dec. 31, 1912.

Application filed May 19, 1911. Serial No. 628,352.

*To all whom it may concern:*

Be it known that I, PHILIP G. HUBERT, a citizen of the United States, residing at Los Angeles, in the county of Los Angeles and State of California, have invented a new and useful Water-Heater, of which the following is a specification.

My invention relates to a new and improved construction in water heaters adapted for use with gas as a fuel.

The object of my invention is to provide a heater which will be economical in gas consumption, light and compact in construction, easy to repair and in which all parts are readily interchangeable. The means by which these and other beneficial results are attained are herein fully described and are shown in the accompanying drawings in which:—

Figure 1 is a vertical sectional view taken longitudinally through the center of the said heater and serves to illustrate the interior construction and the relation of the parts. Fig. 2 is a transverse section taken on the dotted line x—x in Fig. 1, in the direction indicated by the arrow. Fig. 3 is a top plan view of one of the water pans used in my device. Fig. 4 is a side view of the same pan. Fig. 5 is a top plan view of the gas burner and burner pan.

Throughout the several views like characters refer to like parts and referring to the details of construction: 1 is a pan shaped substantially as shown and in size just large enough to fit easily within the outer pan 2. The outer pan 2, a similar inverted cover pan 3 and the band 4, adapted to be retained between the grooved edges of the said pans 2 and 3 in the manner shown, form the outer covering or jacket of the heater. All of the said parts and all other parts are preferably made of metal rolled, pressed or otherwise formed into suitable shapes. Within the said pan 1 is placed a gas burner 5 attached to a gas supply pipe 6 which is inserted through the bottom of said pans 1 and 2. The opening through which said pipe 6 enters said pans is made water-tight by any suitable means. Air supply tubes 7 are formed in the bottom of the pans 1 and 2 in the manner shown and any required number may be used. These tubes introduce the air necessary for the operation of the burner and also provide an opening through which the burner may be ignited.

8 is a pan of a suitable shape supported over the burner 5. This pan 8 is smaller in size than the burner pan 1 and is preferably formed with depressions 1' near its ends and all portions of the bottom slope gradually toward these depressions as shown in Figs. 3 and 4, the object being thus to direct any leakage or surplus water to the lowest point on the said pan before it drips off into the pan below, and the depressions are so spaced that the lowest points are not over the burner and the water falls directly into the pan below without interfering with the operation of said burner.

9 is a pan in size and shape an exact duplicate of the pan 1. This pan 9 is supported by the wall 10 which wall is attached to the edge of the said pan and which in turn rests upon the pan 1. A vent opening 11 is formed in the pan 9 and a vent pipe 12 connected with this vent carries off the burned gases and vapors. A jacket pipe 13 supported by the cover 3 incloses a portion of the vent pipe. The jacket pipe 13 has a funnel shaped top 14 formed as shown.

15 refers to overflow tubes provided in the bottom of the pan 9.

In operation the water is supplied at the funnel 14 from a water supply pipe (not shown) with enough velocity to cause it to swirl around the vent pipe 12. The jacket pipe directs the water through the cover 3 and it falls into the pan 9. When it reaches the level of the top of the tubes 15 the surplus is carried off through the tubes 15 and discharged into the pan 8. Notches 16 are provided in the ends of the pan 8 and when the pan is filled up to the level of the notches the water overflows into the pan 1 beneath. An overflow tube 17 is provided for the pan 1 similar to the tube 15 described above and when the water rises to the top of this tube it overflows into the discharge pipe 18 connected with the bottom of the pan 2. The tube 17 is smaller in size than the pipe 18 and an annular space is left between the tube and the pipe in the manner shown.

The functions and uses of the various parts above designated will appear in the following brief description of the operation of the device. Water is supplied at the funnel 14 in the manner above described and when the pans are filled to the desired level passes out through the discharge pipe 18 after going through the several pans in turn. Gas, or a suitable gas and air mixture, is supplied through the pipe 6 to the burner 5 and the gas ignited by inserting a match through one of the tubes 7. The burner is so arranged that the flame is thrown inward toward the center of the pan 8 but the action of the air currents entering through the openings 7 spread the flame and drives it outward between the edges of the pan 8 and the wall 10, which if desired may be covered with any heat insulating material. The burning gases and vapors then pass along the bottom of the pan 9 to the vent 11 and with most of the heat absorbed then pass out through the vent pipe 12. The arrows in Figs. 1 and 2 indicate the directions in which the vapors pass around and between said pans. The water is somewhat heated by contact with the vent pipe, is subjected to more heat in each of the lower pans and when discharged from the pan 1 it has the desired temperature.

What I regard as one of the most important features of this invention is the manner in which the burner is always partially submerged in the water contained in the pan 1. While this in no way interferes with the flame, in fact seems to aid it, it also serves to keep the temperature of the burner from becoming excessive and materially aids in heating the water.

Attention is called to the fact that all moisture from steam, sweating or leakage within the combustion chamber is directed by the wall 10 into the pan 1. The wall 10 also prevents the outer jacket from becoming overheated.

No water is ever placed directly in the pan 2 and the only water which ever reaches it comes from overflow, or leakage of the pans above and as fast as it so collects it is discharged through the pipe 18.

Having thus described my invention, what I claim as new and desire to secure by Letters Patent is—

In a water heater, the combination of a top water pan adapted to receive the water to be heated and having overflow tubes projecting through its bottom, adapted to discharge water to an intermediate pan beneath said top pan; said intermediate pan having notches adapted to discharge water to a bottom pan for final heating; said bottom pan adapted to receive the partially heated water from said intermediate pan and having an outlet tube adapted to discharge the water from said bottom pan when at its highest temperature; a gas burner partially submerged in the water contained in said bottom pan, the water by reason of its lower temperature acting as a cooling agent to the burner and, by absorbing the heat imparted by the burner, receiving its final heating before being discharged from the bottom pan as above described; a jacket inclosing all of said pans; means for retaining the pans in their relative positions, and a vent opening through the said upper pan and also extending through the said jacket, all as described.

PHILIP G. HUBERT.

Witnesses:
CLAUDE L. MCKESSON,
MAUD WATSON.

---

Copies of this patent may be obtained for five cents each, by addressing the "Commissioner of Patents, Washington, D. C."